(12) United States Patent
Kuźniar

(10) Patent No.: US 10,611,059 B2
(45) Date of Patent: Apr. 7, 2020

(54) DEVICE FOR CURING PIPELINE INNER RESIN LININGS

(71) Applicant: KANRES TECHNOLOGY, Bialobrzegi (PL)

(72) Inventor: Slawomir Kuźniar, Łańcut (PL)

(73) Assignee: BOLONIA SERVICIOS E INGENIEROS, S.L., Madrid (ES)

( * ) Notice: Subject to any disclaimer, the term of this patent is extended or adjusted under 35 U.S.C. 154(b) by 55 days.

(21) Appl. No.: 15/840,782

(22) Filed: Dec. 13, 2017

(65) Prior Publication Data

US 2018/0162017 A1    Jun. 14, 2018

(30) Foreign Application Priority Data

Dec. 14, 2016    (EP) ................................ 16460093

(51) Int. Cl.
| | |
|---|---|
| *F16L 55/40* | (2006.01) |
| *F16L 55/28* | (2006.01) |
| *B29C 35/08* | (2006.01) |
| *B29C 63/34* | (2006.01) |
| *B29C 63/00* | (2006.01) |
| *F16L 101/10* | (2006.01) |

(52) U.S. Cl.
CPC ...... *B29C 35/0805* (2013.01); *B29C 63/0021* (2013.01); *B29C 63/34* (2013.01); *F16L 55/28* (2013.01); *F16L 55/40* (2013.01); *B29C 2035/0827* (2013.01); *F16L 2101/10* (2013.01)

(58) Field of Classification Search
None
See application file for complete search history.

(56) References Cited

U.S. PATENT DOCUMENTS

| | | | |
|---|---|---|---|
| 2006/0204670 A1* | 9/2006 | Siegel ................ | B41F 23/0409 427/487 |
| 2009/0080205 A1* | 3/2009 | Chang .................... | F21V 29/75 362/373 |
| 2010/0051168 A1* | 3/2010 | Moeskjaer ............ | F16L 55/165 156/64 |

OTHER PUBLICATIONS

Datasheet for UVP125 UV Patching and Short Lining Rehabilitation Packer | Sewer Robotics (Year: 2019).*

* cited by examiner

*Primary Examiner* — James Choi
(74) *Attorney, Agent, or Firm* — DeFillo & Associates, Inc.; Evelyn A. DeFillo

(57) ABSTRACT

A device for curing inner pipeline linings made with the use of a resin compound cured by electromagnetic radiation, the device being equipped with a central polyhedral body provided with LEDs generating the radiation by emitting waves with lengths from the range 200-500 nm, to cause curing of the resin compound. The LEDs are shielded with an element made of a transparent plastic or quartz glass with a body made of monolithic cylindrical solids having along the whole of length of their outside surfaces with radii identical flat facets-chords symmetrically distributed on the surfaces, to which detachably attached are plastic plates equipped with LEDs emitting electromagnetic radiation with definite range of wavelengths.

6 Claims, 12 Drawing Sheets

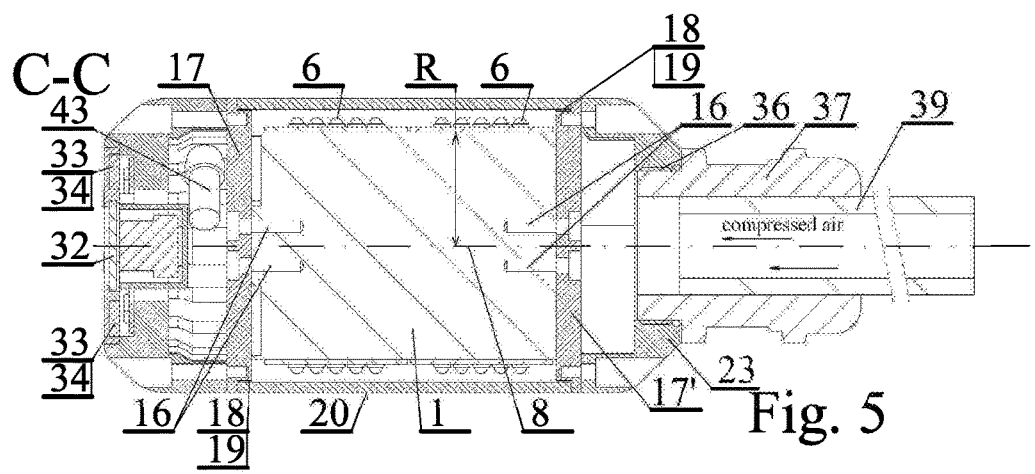
Fig. 5
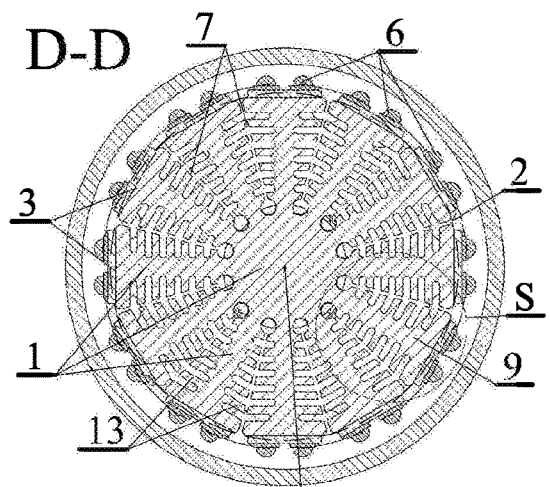
Fig. 6
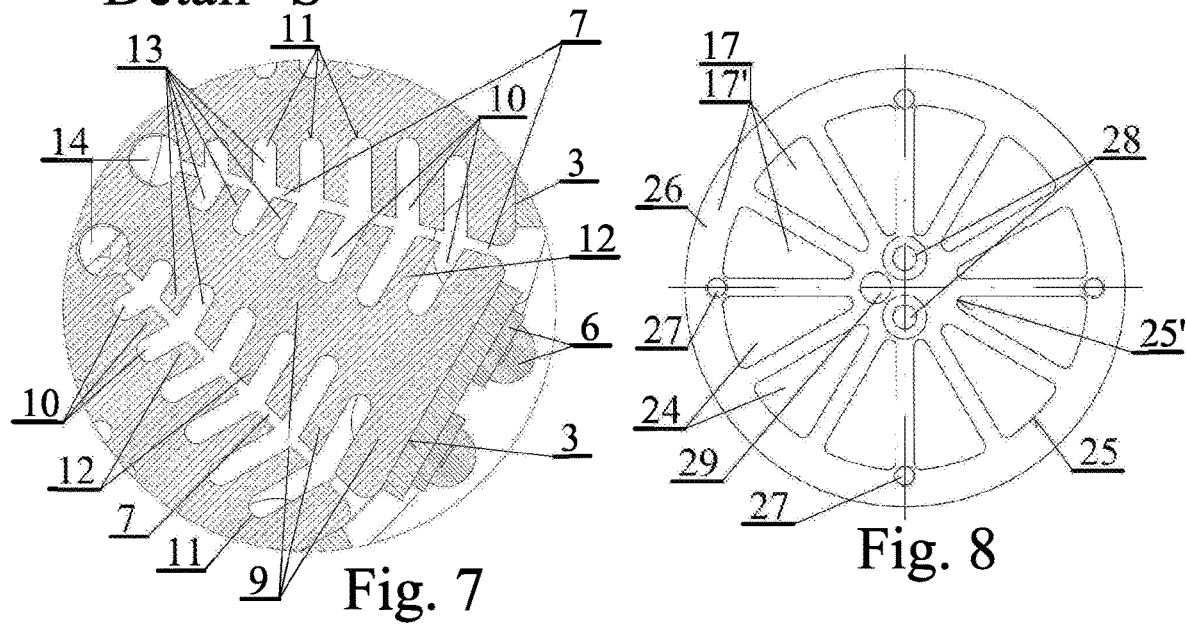
Detail "S"
Fig. 7
Fig. 8

Fig. 12  F-F

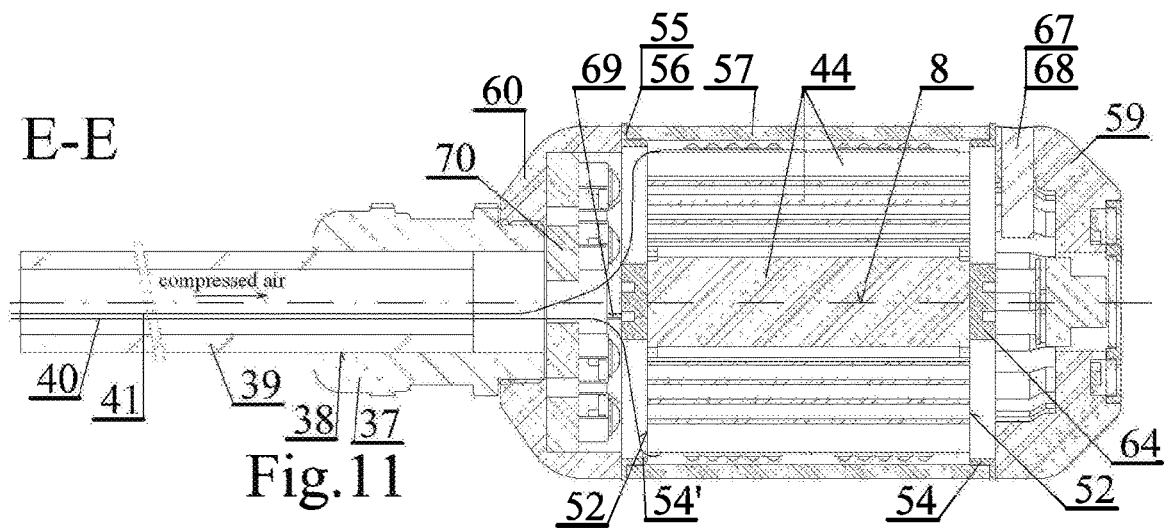
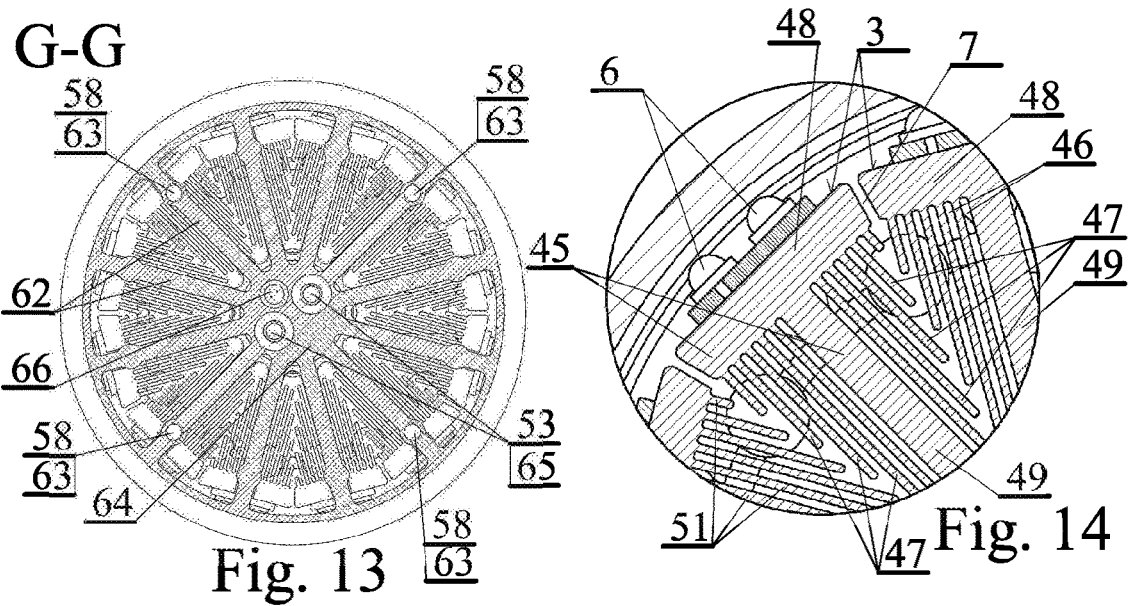

H-H

DEVICE FOR CURING PIPELINE INNER RESIN LININGS

FIELD OF THE INVENTION

The subject of the invention is a device for curing inner linings in pipelines introduced into them in the form of lining tubes impregnated with a resin.

BACKGROUND OF THE INVENTION

Worn-out and leaking pipelines, including sanitary sewerage systems, deteriorated usually because of insufficient maintenance, are subject to renovation by means of lining tubes impregnated with resins, dragged into the pipeline and bonding them with inner surface of the pipeline in order to eliminate leakage and soaking of carried liquids through the pipeline walls showing destructive impact on natural environment.

From Polish patent description No. PL202527 known is a method and a set for renovation of pipelines, where the renovation method according to that invention is characterised in that a liming is placed inside the pipeline and then pressed against the inner surface of the pipeline by means of rings, while ends of the lining are sealed with the use of any known methods by means of cuffs. The lining is introduced in parts which are then joined with the use of any known method by welding or gluing. The lining in the form of a plastic sleeve is joined by means of double-run thermal welding, whereas the welds are being made at definite distances from each other. Pressing of the lining against inner surface of the pipeline with the use of rings is achieved by expanding the rings which are expanded with the use of a cylinder, and when the rings are expanded, their position is fixed and they are joined permanently with the lining Further, the set for renovation of pipelines by means of from-inside method according to the above-quoted invention is characterised in that the set comprises a lining and a set of expandable rings distributed axially along the pipe axis and permanently joined with the lining which has the form of plastic film or the form of plates joined by means of any of known methods, whereas the ring comprises an expanding element.

Pipeline renovation technologies based on lining the pipes with a resin-impregnated tube are described in numerous patents and patent applications, with the so-called inversion technique being described in some of them. Other patent descriptions, e.g. WO2004/104469, reveal a method consisting in dragging a resin lining into pipeline, and hardening or curing of the resin, especially thermosetting one, consists mainly in the use of hot water or hot steam.

Further, patent description WO93/15131 reveals a pipeline renovation method in which ultrasonic radiation is used to cure resin lining. To this end, a movable device is used equipped with ultrasonic transducers, introduced into and translated along the pipeline as well as the catalytic component of the resin contained in micro-capsules which are torn apart by energy of the ultrasonic field. The resin tube constituting the lining is placed in pipeline and then cured by means of ultrasonic energy in order to release the curing catalyst.

A newer method of curing tubular resin lining on inner surface of pipeline consists in the lining being irradiated with UV waves, with an vacuum electron lamp being used for this purpose as a source of radiation introduced into the pipeline and said radiation resulting in the resin lining being cured by means of the device emitting such ultraviolet radiation.

However, it turned out that despite a number of good points characterising this method of curing resin pipeline linings, including minimisation of energy consumption compared with conventional method of curing resin linings by means of hot water of steam, the device has a serious flaw consisting in that UV radiation emitted from the device is very harmful to health and threatens lives of workers operating the devices.

From patent description WO2005/103121 known is a photosetting composition of resins which is cured by means of irradiation with visible light, especially light with wavelength of about 450 nm, i.e. blue light, whereas the relevant patent application refers to different techniques encompassing the prior art available at that time, describing also the favourable features of such curing.

Further, from patent description of European patent No. EP 2129956 B1 known are two design versions of the device for curing pipeline inner linings based on the use of light emitting diodes (LEDs) which, contrary to UV-radiation emitting devices based on application of vacuum tubes, are characterised with high stability, generally constant efficiency of energy or power emission level throughout the LED service life, whereas to increase effectiveness of these devices, they are equipped with an integrated fluid-based cooling systems. The device according to the first version of embodiment of this invention has a central eight-section (octahedral) segment of the device's housing provided on both ends with annular spacers, attached by means of fasteners, whereas the spacers with outer diameter adjusted to the inner diameter of pipeline lining have flange-shaped protrusions offset outside with holes for said fasteners, and within the vicinity of at least one of the spacers mounted is a fan forcing the flow of compressed air via inner axial hole in said segment of the device's housing. The fan cools LEDs contributing to dissipation of heat onto inner finned radiators situated opposite the LEDs. Further, the rear sleeve-shaped spacer situated on the fan side is equipped with a Cardan joint allowing to couple the above-described single devices with a second analogous device. Moreover, each of the eight sections of the housing segment is equipped with a printed circuit board PCB with twelve diodes mounted on it, so that the housing segment has a total of 96 diodes, of which 95 are light-emitting diodes (LEDs) and the one is a temperature or infrared detecting diode used to monitor temperature of inner surface of the cured pipeline lining, and further, PCB holds a temperature sensor to prevent increase of LED temperature above an admissible maximum level, said sensor being connected in series with light-emitting diodes and used to deactivate them in case of detecting temperature values exceeding those pre-assumed to be the maximum admissible ones. Furthermore, the front portion of each profiled section of the device's housing segment has a cavity in which a transparent shield is placed to provide mechanical protection for LEDs placed under the cover, whereas opposite this protective shield, the above-mentioned printed circuit board PCB is placed with its front face oriented opposite the LEDs, coupled by means of the thermal conductivity with finned metallic element (radiator) radiating the heat out and channelling the heat generated by the light emitting inside the housing segment provided with a straight-through duct in which compressed air is supplied under pressure through said housing segment to cool the finned metallic elements and thus cooling LEDs emitting electromagnetic radiation. Each of the eight profiled sections of the device's housing segment is positioned in a way allowing to connect it to the neighbouring analogous profiled housing section and thus obtain the octahedral segment of the housing, whereas side surfaces of each section, which are to be connected to side surfaces of neighbouring sections of the housing, are provided with semicircular hollows, allowing to interconnect the eight profiled sections of the housing with each other by means of straight-through pins inserted in them.

In another version of embodiment of the device according to the above-quoted invention, the device comprises two housing segment, both having the shape of a circular cylinder, assembled out of six arched sections of each segments of the housing, and each of the sections is equipped with twelve LEDs and six front elements with the profile of a ring segment, connected with each other by means of spacers and securing pins so that the two housing segments connected with each other have a total of twelve sections containing a total one hundred and forty four LEDs.

SUMMARY OF THE INVENTION

The objective of the present invention is to provide a simple and compact design for a device a device for curing inner pipeline linings impregnated with resins cured by means of radiation, having a body constructed in the form of a cylinder, equipped with LEDs distributed on the whole perimeter and length of the cylinder, supplying to the lining surface, at the maximum operating level, the electromagnetic radiation power several times higher and to larger depths compared to known devices of that type. A further objective of the invention is to equip the body of the device with such a number of LEDs with such a power equalling preferably 50 W per each trapezium-profiled plates which would allow, depending on needs, to switch them on and off in a sequence. On the other hand, the technical problem that needed to be solved was to develop a design of a devices equipped with a monolithic body, component elements of which would allow to focus the whole power of LEDs on the whole circumference of the circle and increase effectiveness of the LEDs cooling process by means of radiators with enlarged cooling surface, enabling also at the same time to cool directly the outside surfaces of the diodes when the electromagnetic radiation is emitted, allowing thus to achieve the objectives according to the present invention.

The subject-matter of the device for curing pipeline inner resin linings with the use of resin compound cured by means of electromagnetic radiation equipped with a central polyhedral body provided with LEDs generating the radiation and emitting waves with lengths from the range 200-500 nm to cause curing of said resin compound, where said LEDs are shielded with an element made of transparent glass or quartz glass, whereas the body is equipped with finned metal elements functioning as radiators carrying away the heat generated by the LEDs, and to the inlet of an axial straight-through hole provided in the front shield element of the body supplied is compressed air for cooling the diodes, or the input of the device is equipped with a fan cooling the LEDs via radiators, and moreover the device is equipped with sensors of temperature of LEDs, a monitoring camera, a hose supplying compressed air for cooling the diodes, leads supplying electric power to LEDs and temperature sensors, and vehicle assemblies, and further, the front portion of the device is equipped with a hook for a rope dragging the device along the pipeline is characterised in that its diversified bodies constitute monolithic cylindrical solids provided, along the whole length of their outside surfaces with different radii, with identical flat facets-chords distributed symmetrically on the surfaces, and with said facets-chords detachably joined are plastic plates equipped with LEDs emitting electromagnetic radiation with definite range of wavelengths, whereas the plastic strip-shaped of the body are joined detachably with the chords situated on and along these chords in two rows, and in each of the plates there are LEDs mounted, also in two rows, preferably five LEDs in each row.

Between each two chords situated next to each other, provided are slit grooves, radially oriented and terminated with circular or semicircular grooves with diversified ranging from ⅔ to ¾ of lengths of radii of the bodies, and side walls of the identical figures separated this way from each other and with their shapes close to isosceles trapeziums are provided with profiled recesses functioning as radiators which are supplied with compressed air for cooling LEDs via profiled recesses in brackets, whereas the air outlet is provided in analogous brackets which are joined detachably with rear and front faces of body of the device, which is joined, also detachably, with front covers and rear covers, respectively, or with the rear lid. Further, inside its profiled front covers of the device mounted are monitoring cameras shielded with glass plates, and above them, in bean-shaped holes, mounted are LEDs (34) illuminating the cameras, and still above them, on the perimeter of faces of the covers, provided are outlet holes for air cooling the LEDs. Moreover, both of the brackets of the device have the shape of circular plates provided with profiled holes with shapes of the holes close to isosceles trapeziums and situated opposite radiators of the device, or upper inner ends of the brackets are provided with annular recesses in which a monolithic glass sleeve-shaped shield for LEDs is permanently mounted. It is favourable when the radiators have Christmas-tree-shaped profiles formed by obliquely oriented grooves and ribs separating them, with lengths diminishing towards horizontal axes of their bodies. It is also favourable when radiators of the body of the device are T-shaped figures with lateral two-sided slit-shaped recesses forming strip-shaped rectangular longitudinal two-sided offsets from upper oblique members of T-shaped profiles and oriented in parallel to lower longer elements of the profiles, whereas the strip-shaped side offsets have lengths decreasing towards these upper elements of the T-shaped profiles. It is favourable when the rear face of the body is joined detachably with a rear lid in the sleeve-shaped portion of which mounted is a fan blades of which blow air into radiators of the body, said air being supplied from outside via air inlet holes provided in the surface of the front conical profile of the lid. It is also favourable when the device has a monolithic metallic body in the form of a cylinder provided on its outer surface with flat facets-chords to which plates are attached detachably, and between each two neighbouring chords and along the body provided are grooves oriented along its horizontal axis, while side walls of the trapezium profiles formed this way are provided with profiled grooves separated from each other with ribs, functioning as radiators with Christmas-tree-shaped profiles, whereas to both flat surfaces of the device's body attached are brackets and profiled covers, whereas the outer diameter of the body with LEDs is about two times larger from outer diameters of the covers.

Favourably, a nozzle for compressed air is formed between the front cover of the device and the front bracket which directs the air after cooling the LEDs onto the cured lining sleeve of the pipeline illuminated by the LEDs. It is favourable also when LEDs are connected functionally with each other so that it is possible to activate and deactivate them alternately depending on the required intensity of electromagnetic radiation emitted into the cured surface.

By equipping the body of the device in such a number of plates carrying LEDs with the total power of preferably 50 W per board allows, if necessary, to switch the diodes on and off in a sequence or switch all the diodes on with their definite rated powers, e.g. to switch on a half of LEDs at 33% of power and another half at 67% power with rated power of 50 W, where the diodes alternately exchange the power emitted by them and the pipeline is illuminated along the whole of its circumference. The body of the device can be equipped with LEDs with total rated power of 300 W which is achieved by activating them e.g. for 1 second at power of 200 W and for subsequent 1 second at power 400 W, or at power of 500 W for 1 second and at 100 W for the next 1 second, which allows to obtain a rated power equalling the arithmetic average and at the same time, to obtain higher power of electromagnetic radiation directed onto pipeline surface.

The use of monolithic cylindrical solid with a dozen or so facets distributed evenly along its circumference and constituting the bases on which LEDs can be mounted, as well as upper portions of radiators with well-developed side surfaces and separated from each other with slit-shaped recesses in the device according to the invention, allowed to simplify significantly the design of the device and at the same time, to reduce the number of its components. Each of the variants of the body, each with different profiles of its radiators, may be fabricated with the use of inexpensive method such as liquid blast cutting or wire spark machining which reduces significantly the labour intensity and manufacturing cost of the device.

Another advantage of the invention is that the cooling air circulates simultaneously both over the profiled radiator cooling it this way and over outer surface of LEDs where the higher temperature occurs, and the leads supplying power to the diodes are guided along the outer wall of radiators which allows to cure the resin lining to larger depths compared to other known devices of that type in which, in contrast to the above-described cooling air circulation pattern, air flows first via a central axial hole in the device, and only on its way back cools the heated LEDs where temperature reaches the highest value. Moreover, in the solution according to the invention, each separate profile of radiator to which plate elements on which LEDs are installed, is connected with the solid of the body in which the temperature sensor is placed showing, regardless of the number, power, and configuration of active LEDs indicates temperature of the whole device protecting both the device and the pipeline against damage or possible fire. An essential merit of the device is also that each board with LEDs is fixed to identical separate radiator connected with the core of device body ensuring this way that operating and cooling conditions are uniform. Moreover, by situating the LED-carrying plates in two rows with several plates in each row on separate radiators and with several LEDs on each board situated next to each other offers the possibility to switch, depending on needs, the LEDs on and off alternately according to precisely defined schedule and this way, to deliver the required dose of electromagnetic radiation at lower power consumption which additionally protects the device from overheating which is also advantageous, especially in pipelines with small diameters and thin walls of their lining. Sequential activation and deactivation of diodes creates an impression of spinning and additionally, offers the possibility of supplying proper amount of radiation onto given surface to be cured.

BRIEF DESCRIPTION OF THE DRAWINGS

The subject matter of the invention is shown in five variants of its embodiments in drawings, of which:

FIG. 5—the same device in axial section along line C-C;

FIG. 6—the same device in cross section along line D-D;

FIG. 7—an enlarged detail "S" of FIG. 6 showing the Christmas-tree shape of radiators provided in body of the device;

FIG. 8—a bracket of the device with inlets for air cooling LEDs, in the front view;

FIG. 11—the same device according to the second variant of its embodiment in axial section along line E-E;

FIG. 12—the same device according to the second variant of its embodiment in cross section along line F-F;

FIG. 13—the same device according to the second variant of its embodiment in cross section along line G-G;

FIG. 14—enlarged detail "T" of FIG. 12 showing the shape of strip-shaped rectangular radiators with their lengths increasing towards the horizontal main axis of the device;

DETAILED DESCRIPTION OF THE INVENTION

Figure 1:
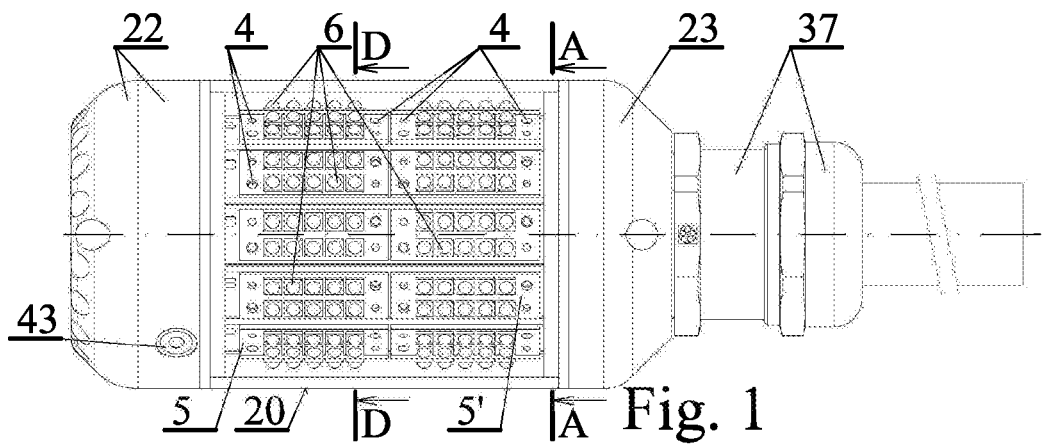
FIG. 1 shows the first variant of embodiment of the device for curing pipeline inner resin linings, body of which is provided with radiators with Christmas-tree-shaped profiles, in the front view.
Figure 2:
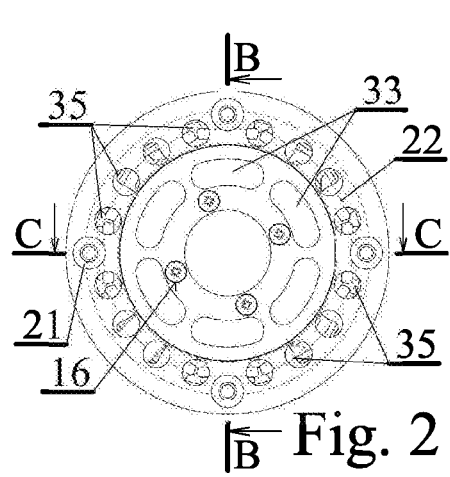
FIG. 2—the same device in the side view from the camera side.
Figure 3:
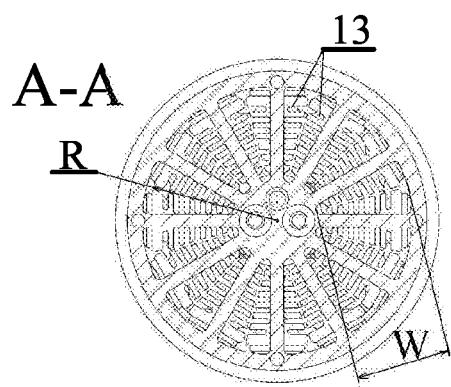
FIG. 3—the same device in cross section along line A-A.
Figure 4:
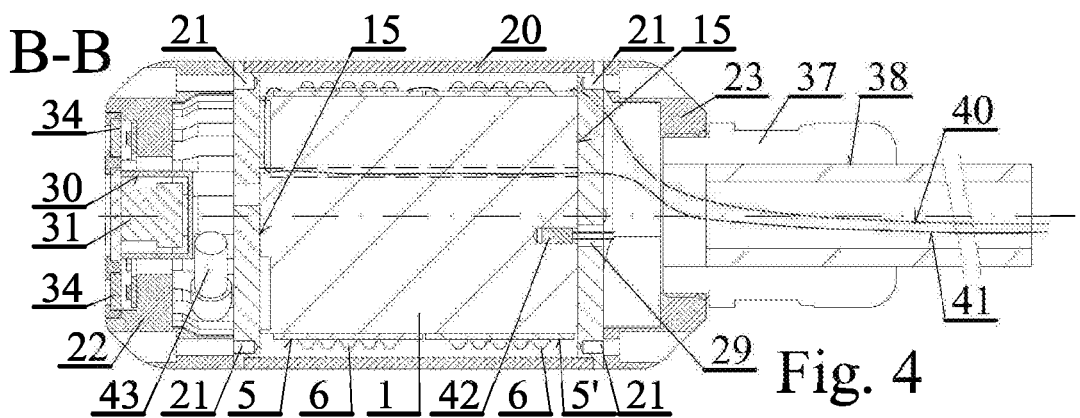
FIG. 4—the same device in axial section along line B-B.
Figure 9:
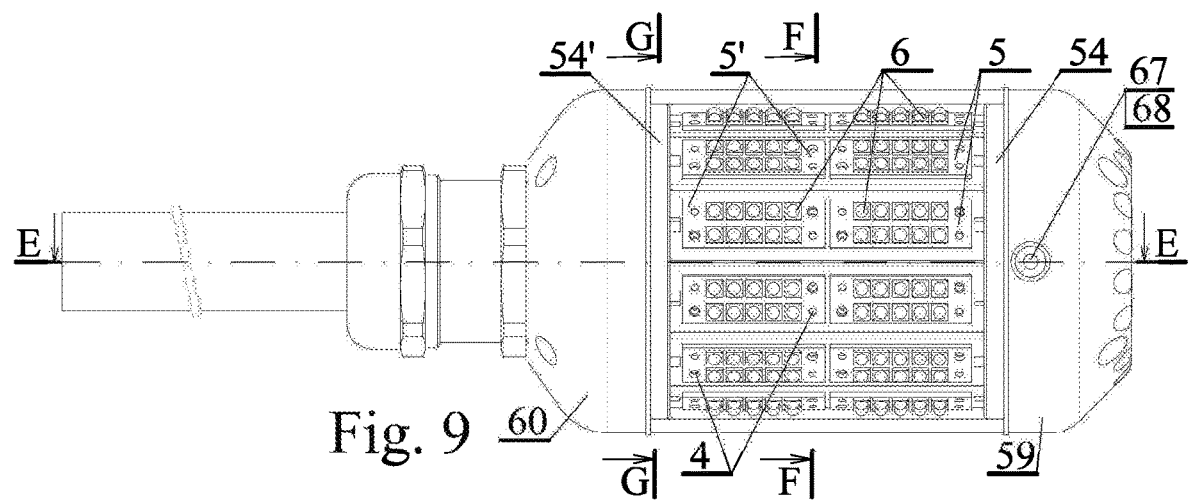
FIG. 9—the second variant of embodiment of the device for curing pipeline inner resin linings, body of which is has radiators with profiles of rectangular strips with variable lengths, in the front view.
Figure 10:
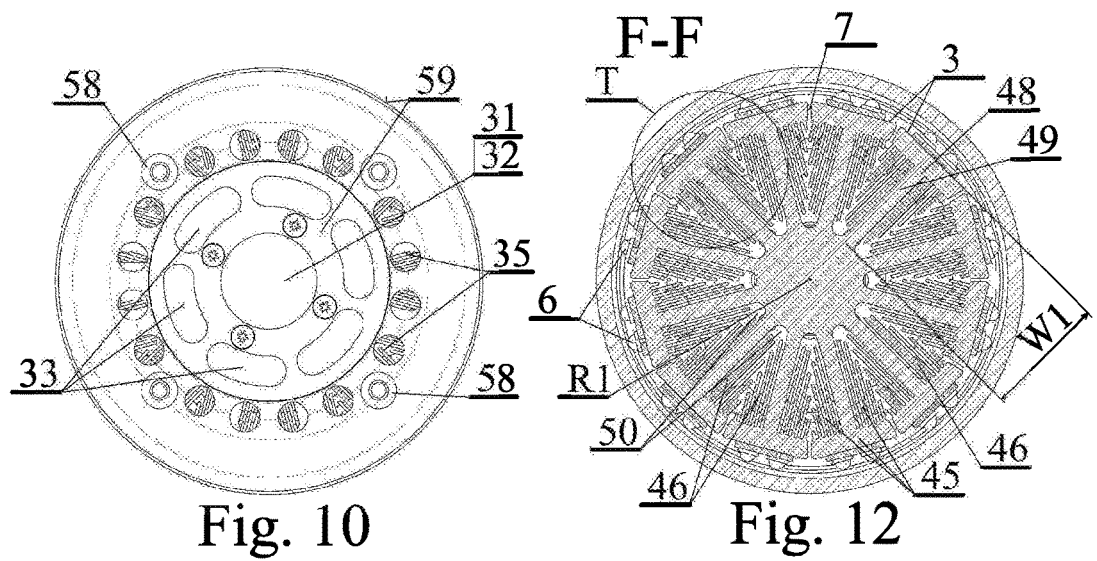
FIG. 10—the same device according to the second variant of its embodiment, in the side view.

The device for curing pipeline inner resin linings impregnated with a cured resin according to the first variant of its embodiment shown in FIG. 1-8 comprises a monolithic metal body 1 with a profile close to a cylindrical one, provided on its outer surface with twelve flat facets 3 constituting chords of the circle symmetrically distributed on the perimeter of its circle 2 with radius R, with identical strip-shaped plastic plates 5 and 5' attached to the facets by means of screws 4 and arranged in two rows along these facets, each of the rows comprising twelve plates with LEDs 6 installed in them which emit electromagnetic radiation with wavelength 350 nm situated next to each other also in two rows, five LEDs in each row, whereas between each two neighbouring chords-flat facets 3 and along the body provided are slit-shaped grooves 7 oriented along horizontal axis 8 of the body with height "W" of the grooves equalling about ⅔ of the length of radius R of the circle, creating thus twelve FIG. 9 profiles of which in the side view and in cross section have the shape similar to an isosceles trapezium two longer inner sides of which are provided on their surfaces with obliquely oriented grooves 10 with their bottoms 11 diminishing towards the axis 8 forming thus a Christmas-tree-shaped profile, where the grooves are separated from each other by ribs 12 functioning, together with the grooves, as radiators 13, whereas all the grooves 7, in their lower portions, are terminated with longitudinal circular grooves 14. Further, to both flat front surfaces 15 of the body 1 there are brackets 17 and 17' fixed by means of bolts 16, with upper inner ends of the brackets being provided with annular recesses 18 in which, by means of a packer 19, permanently mounted is a sleeve-shaped shield 20 for LEDs 6 made of quartz glass, outer surface of which is flush with outer surfaces of brackets 17 and 17' and with outer surfaces of the profiled front cover 22 and the profiled rear cover 23 which are joined with the brackets by means of bolts 21. Both of the brackets 17 and 17' of the device have the shape of circular plates provided on their surfaces with twelve identical symmetrically distributed profiled holes 24 with shapes close to isosceles trapeziums with their shorter sides 25 and 25' rounded and situated opposite radiators 13 of the body 1, and moreover the brackets, on perimeter of their annular portion 26, are provided with symmetrically distributed four holes 27 for bolts 21, and in their central portion, with two holes 28 for bolts 16 as well as a hole 29 situated close to them.

Inside the profiled front cover 22, mounted is a shield 30 with a monitoring camera 31 placed in it which together are covered with a glass plate 32, and above them, in bean-shaped holes 33 distributed evenly on face of the cover, mounted are LEDs 34 illuminating the camera, and still above them, on the perimeter of face of the cover, provided are outlet holes 35 for air cooling LEDs 6 installed on outer surface of body 1 of the device. The monitoring camera 31 is used to identify location of the device in the renovated pipeline on current basis and to assess the condition of the resin lining cured by means of electromagnetic radiation both before and after activation of electromagnetic radiation emitted by LEDs 6. Further, the face of profiled rear cover 23 is provided with an axial threaded hole 36 into which a sleeve-shaped stuffing box 37 is screwed in provided with an axial bore 38 with a hose 39 installed in it which via trapezoidal holes 24 in bracket 17' supplies compressed air to radiators 13 of the body 1, whereas through the hose and through grooves 14 in the body guided are electric leads 40 and 41 supplying power to LEDs 6 and LEDs 34 illuminating the field of view of the monitoring camera 31. Moreover, via hole 29 provided in bracket 17', in the body 1 mounted is a device temperature sensor 42, whereas in the front cover 23 of the device there is a pipeline lining sleeve temperature sensor 43, both sensors being used to control correct operation of the device.

The device for curing pipeline inner resin linings according to the second variant of its embodiment shown in FIGS. 9-14 has also a monolithic metal cylindrical body 44 with radius R1, which on the circumference of its outer surface has twelve symmetrically distributed flat facets 3 constituting chords of circle of the body to which, also by means of screws 4, attached are identical strip-shaped plastic plates 5 and 5', situated in two rows along these facets, twelve plates in each row, with LEDs 6 installed in them also in two rows, five LEDs in each row, whereas between each two neighbouring chords-flat facets 3 and along the body, there are slit-shaped grooves 7 oriented in direction of its horizontal axis 8 with height "W1" equalling about ¾ of the length of radius R1 of the circle, creating thus twelve FIG. 45 with profiles having cross sections in the form of letter "T" with lateral two-sided slit-shaped recesses 46, forming strip-shaped rectangular longitudinal two-sided offsets 47 from upper oblique elements 48 of T-shaped profiles and oriented in parallel to lower longer elements 49 of the profiles, whereas the strip-shaped side offsets 47 have lengths decreasing towards these upper elements 48 of T-shaped profiles, and each two longer elements 49 situated radially-obliquely and opposite each other are connected by means of semi-circular grooves 50 oriented in parallel to the horizontal axis 8, whereas the strip-shaped rectangular offsets 47 separated from each other with slit-shaped recesses 46 function as radiators 51. Further, to both flat front surfaces 52 of the body 44 there are brackets 54 and 54' fixed by means of bolts 53, with upper inner ends of the brackets being provided with annular recesses 55, in which, by means of a packer 56 permanently mounted is a glass shield 57 for LEDs 6, outer surface of which is flush with outer surfaces of the brackets with outer surfaces of the profiled front cover 59 and the profiled rear cover 60 which are joined with the brackets by means of bolts 58. Both of the brackets 54 and 54' of the device have the shape of circular plates provided on their surfaces with twelve identical symmetrically distributed profiled holes 61 with their shape close to an isosceles trapezium with their shorter sides rounded and situated opposite radiators 51 of the body 44, which are separated from each other by means of rib-shaped elements 62, of which four robs are provided with holes for 63 for bolts 58 and a central core portion 64 provided with two holes 65 for bolts 53 and a groove 66.

Inside the profiled front cover 59 attached to bracket 54 by means of bolts 58, there is a monitoring camera 31 mounted in the symmetry axis of the cover and covered with a front glass plate 32, and above them, in six bean-shaped holes 33, distributed evenly on the face of the cover, mounted are LEDs 34 illuminating the camera, and still above them, on the perimeter of the cover face, provided are outlet holes 35 for air cooling LEDs 6 installed on outer surface of body 44 of the device. Moreover, cylindrical portion of the profiled front cover 59 is provided with a hole 67 where a sensor 68 for monitoring of temperature of the pipeline lining sleeve is installed. Further, inside the profiled rear cover 60 mounted is a device temperature monitoring sensor 69 and a measuring converter 70 for the temperature, whereas the cover provided also with an axial threaded hole 36 into which a sleeve-shaped stuffing box 37 is screwed in provided with an axial bore 38 with a hose 39 installed in it which via trapezoidal holes 61 in bracket 54' supplies compressed air to radiators 51 of the body 44, whereas through the hose guided are electric leads 40 and 41 supplying power to LEDs 6 and 34, temperature sensors 68 and 69, the measuring converter 70, and the monitoring camera 31 of the device. The camera is used to identify location of the device in the renovated pipeline on current basis and to assess the condition of the resin lining cured by means of electromagnetic radiation both before and after activation of electromagnetic radiation emitted by LEDs 6.

Figure 15:
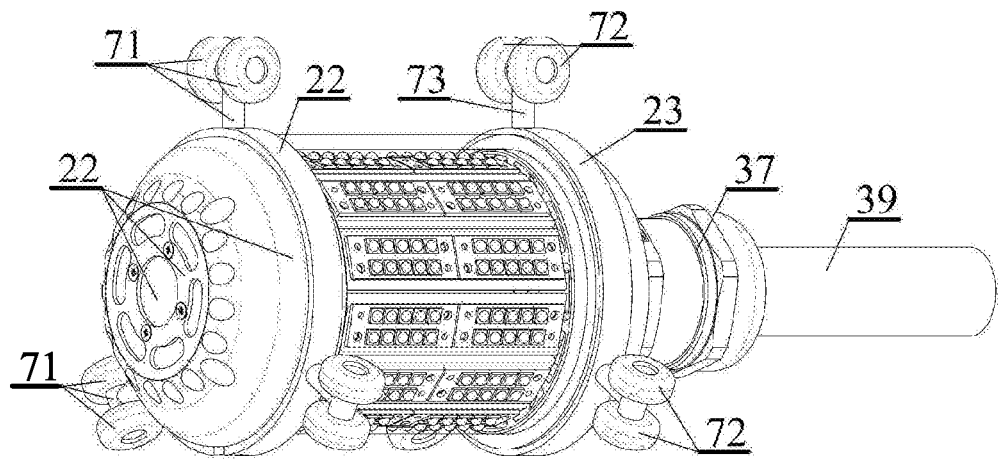
FIG. 15—the device shown in FIGS. 1-8 or in FIGS. 9-14 representing its third variant, equipped with two vehicle assemblies, in a perspective view.
Figure 16:
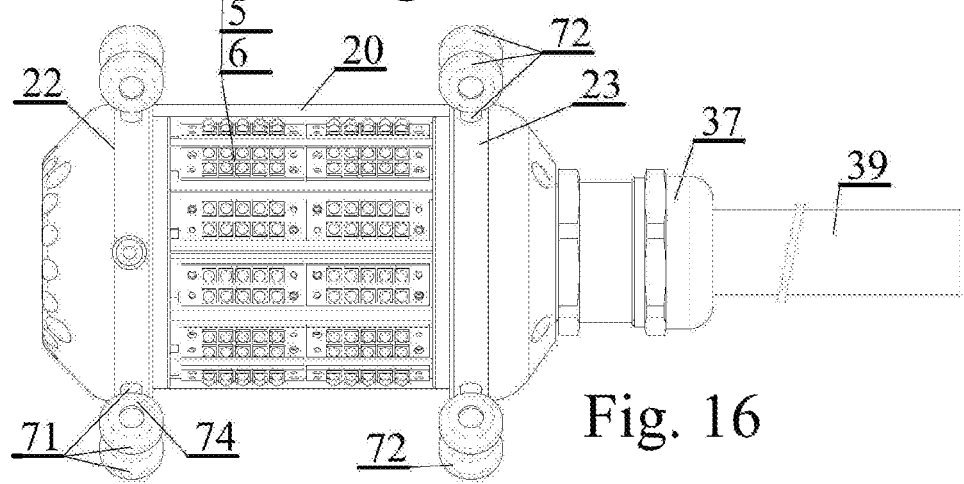
FIG. 16—the device according to the third variant of its embodiment in the front view.
Figure 17:
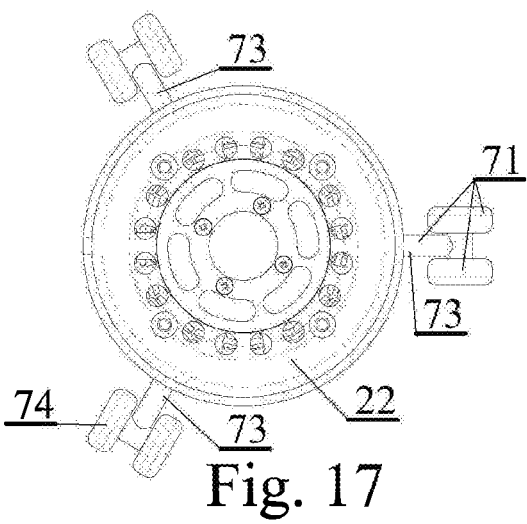
FIG. 17—the device according to the third variant of its embodiment, in the side view from the camera side.
Figure 18:
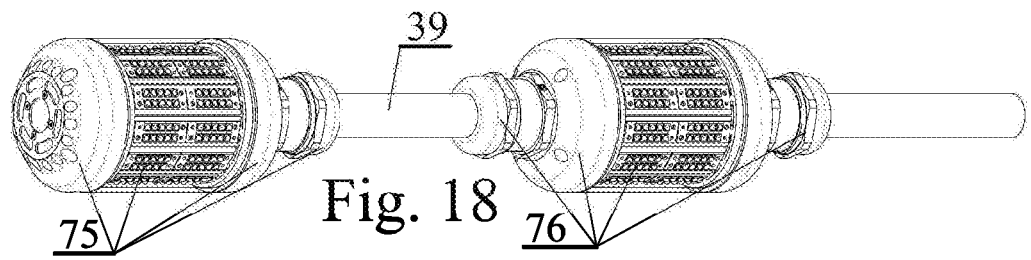
FIG. 18—a set of two devices connected with each other by means of a hose supplying compressed air for cooling diodes, composed of a device with camera and a device without camera, in a perspective view.
Figure 19:
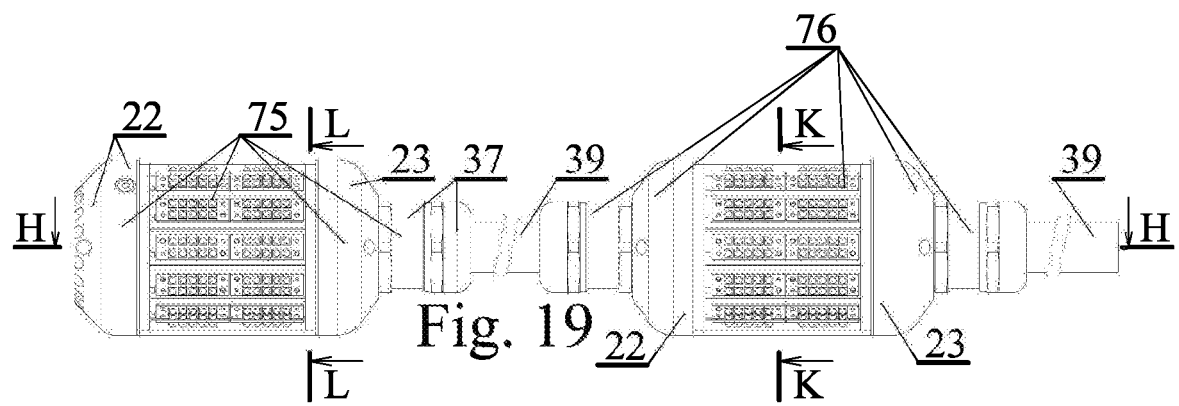
FIG. 19—the same set of two devices, in the front view.
Figure 20:
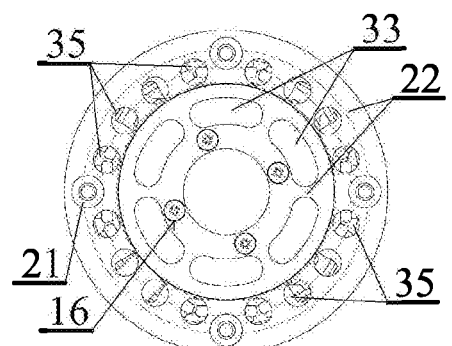
FIG. 20—the device with camera from the same set of devices, in the side view.
Figure 21:
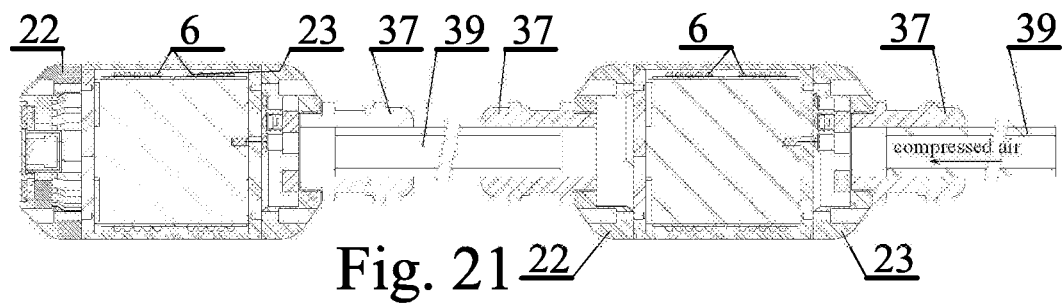
FIG. 21—the same set of two devices in axial section along line H-H.
Figure 22:
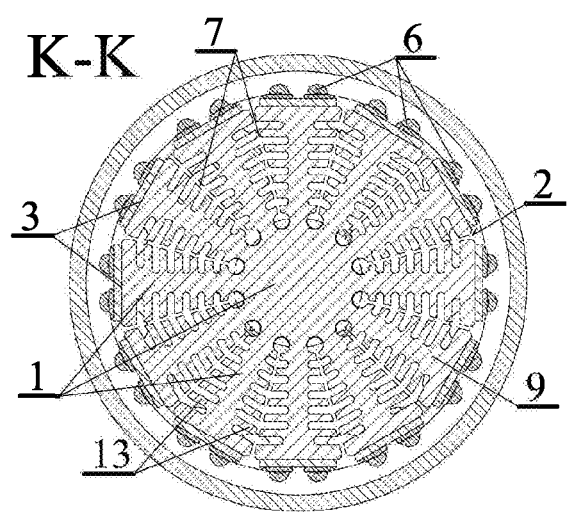
FIG. 22—the device without camera of the same set of devices, in cross section along line K-K.
Figure 23:
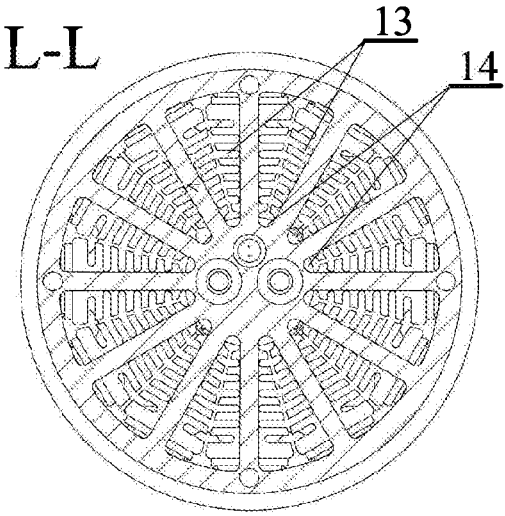
FIG. 23—the device with camera of the same set of two devices, in cross section along line L-L.
Figure 24:
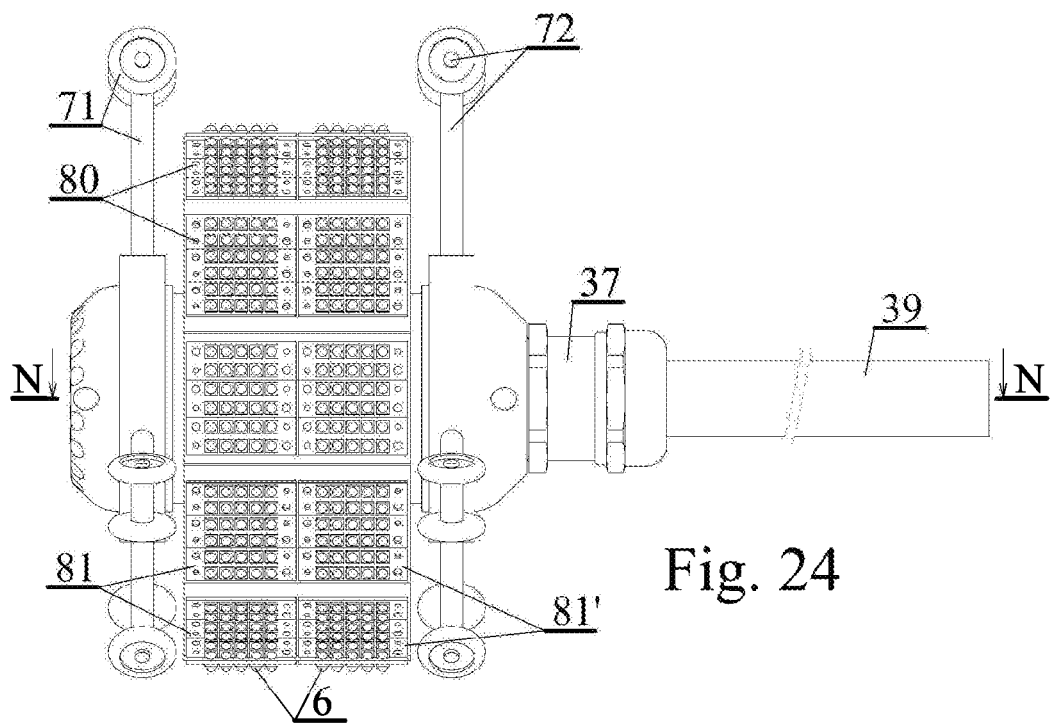
FIG. 24—the fourth variant of embodiment of the device for curing pipeline inner resin linings, body of which with LEDs and radiators has a diameter larger than the diameter of its brackets and side covers, in the front view.
Figure 25:
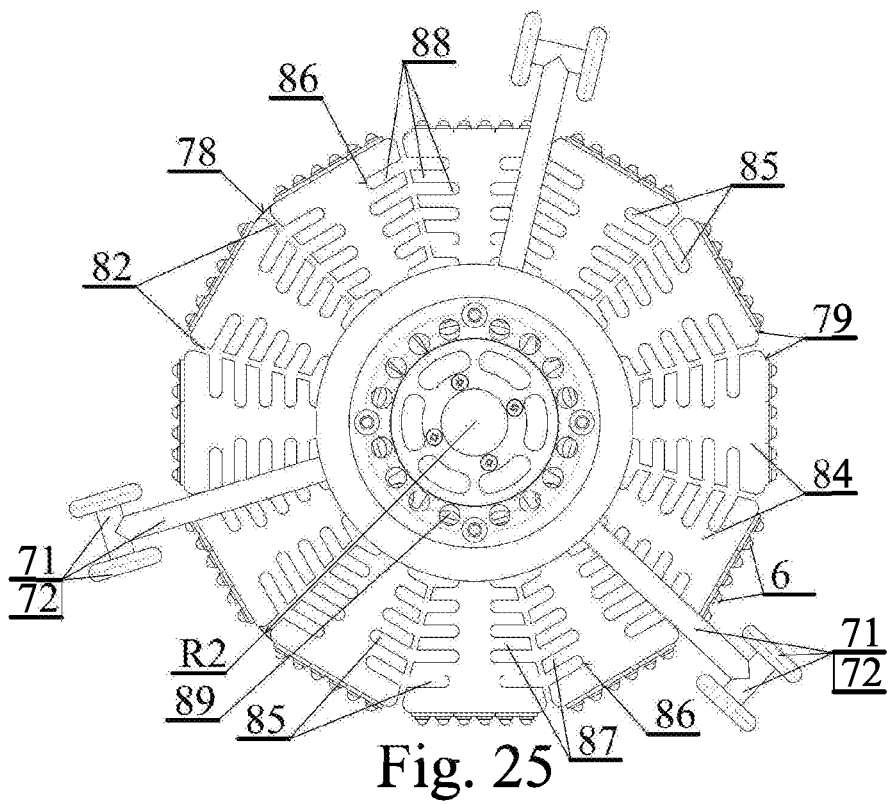
FIG. 25—the same device according to the fourth variant of its embodiment, in the side view from the camera side.
Figure 26:
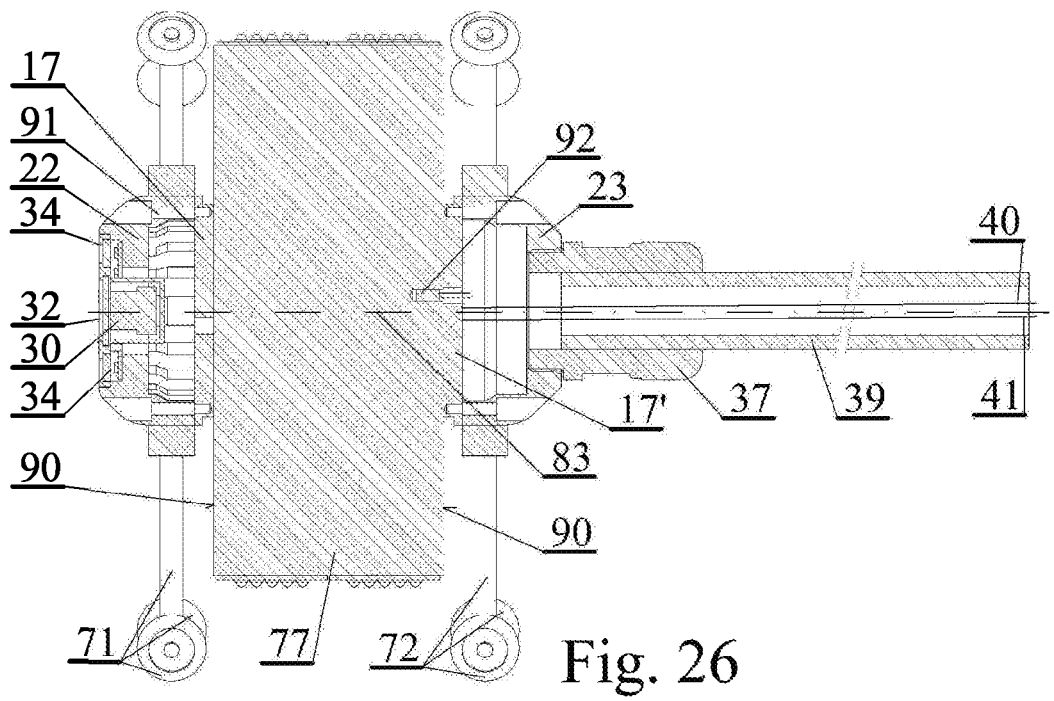
FIG. 26—the same device according to the fourth variant of its embodiment, in axial section along line N-N.
Figure 27:
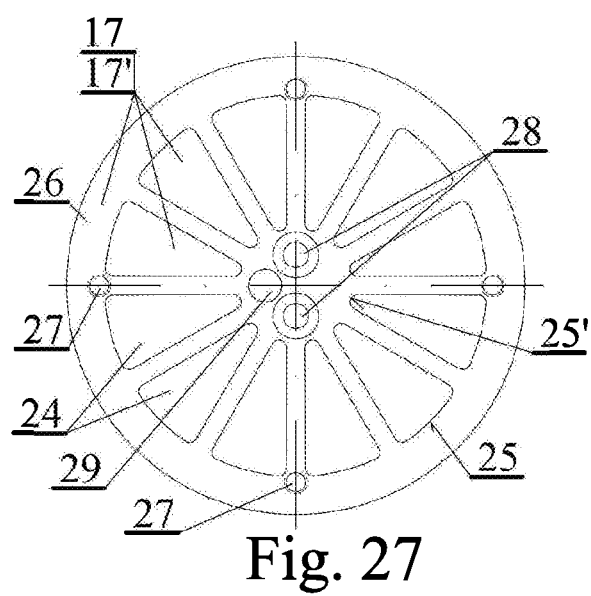
FIG. 27—the bracket of the fourth variant of the device with inlets of air for cooling LEDs.
Figure 28:
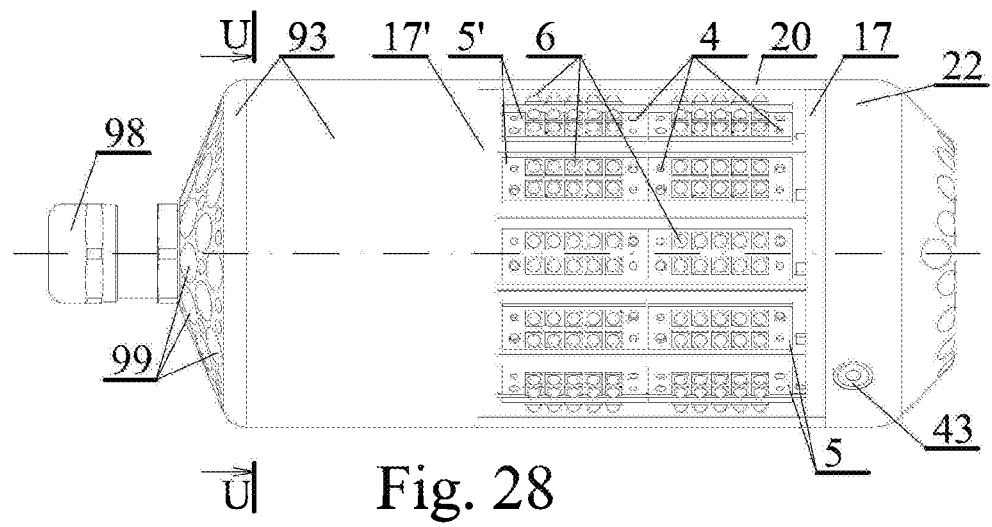
FIG. 28—the fifth variant of embodiment of the device but equipped with a fan for cooling LEDs, in the front view.
Figure 29:
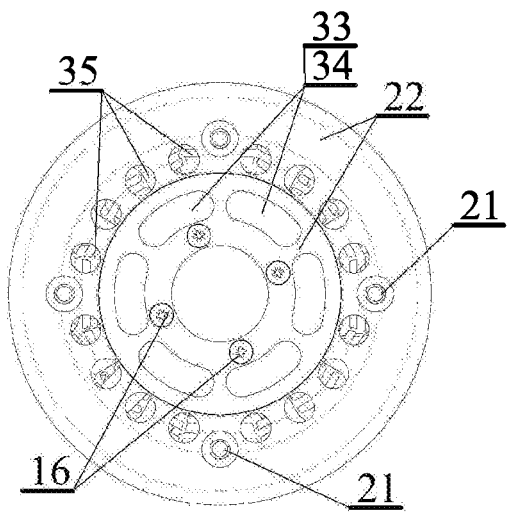
FIG. 29—the same device according to the fifth variant of its embodiment, in the side view from the camera side.
Figure 30:
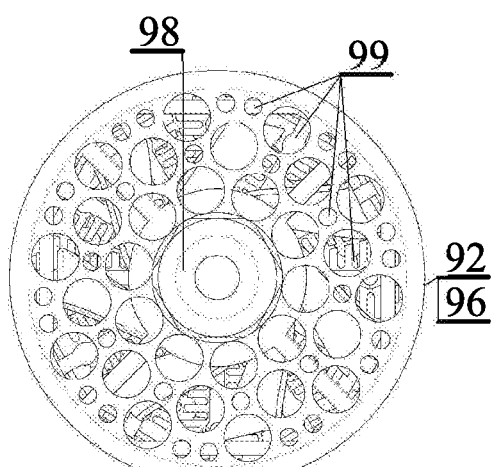
FIG. 30—the same device according to the fifth variant of its embodiment as seen from the sleeve-shaped stuffing box side.
Figure 31:
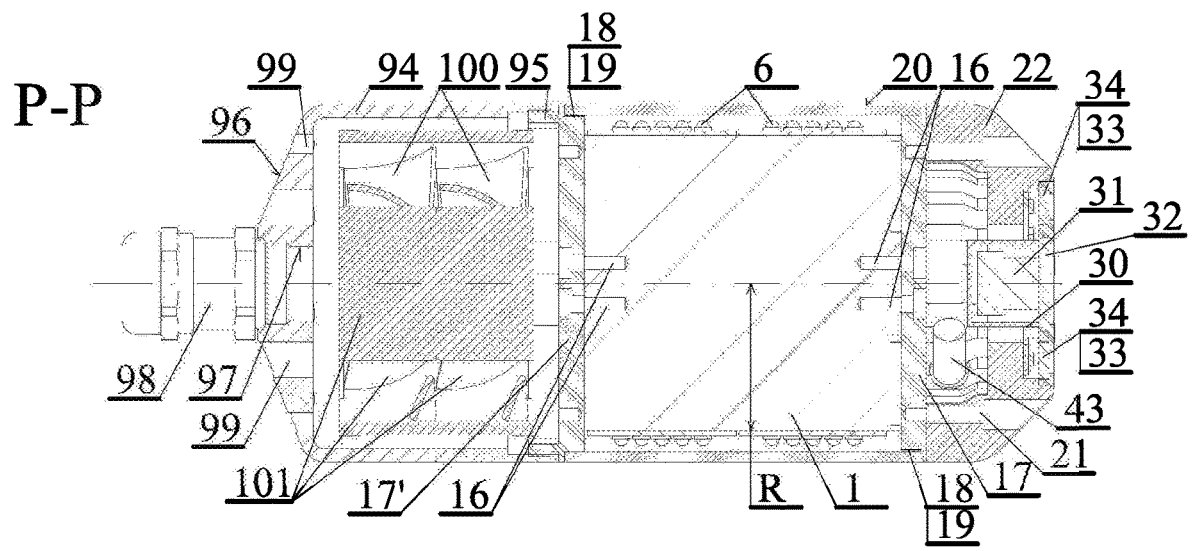
FIG. 31—the same device according to the fifth variant of its embodiment, in axial section along line P-P.
Figures 32, 33:
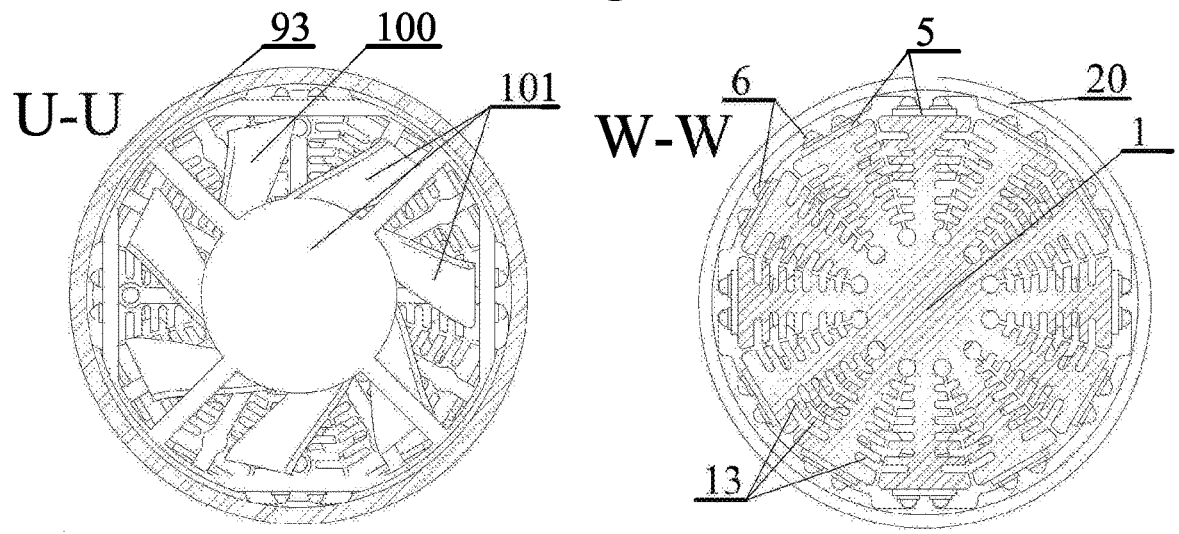
FIG. 32—the same device according to the fifth variant in cross section along line U-U.
FIG. 33—the same device according to the fifth variant in cross section along line W-W.
Figure 34:
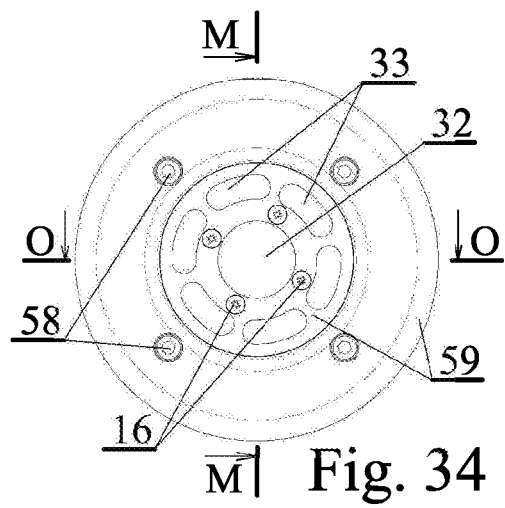
FIG. 34—the sixth variant of embodiment of the device but with the outlet of cooling air pointing the cured pipeline, in the front view from the monitoring camera side.
Figure 37:
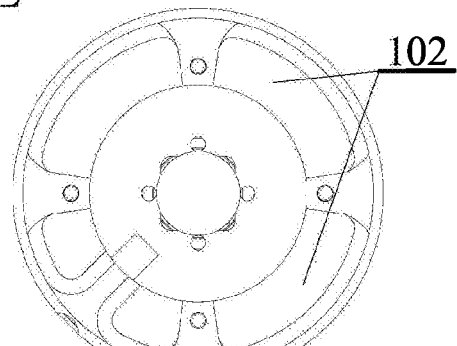
FIG. 37—the same device in cross section along line Z-Z.
Figure 35:
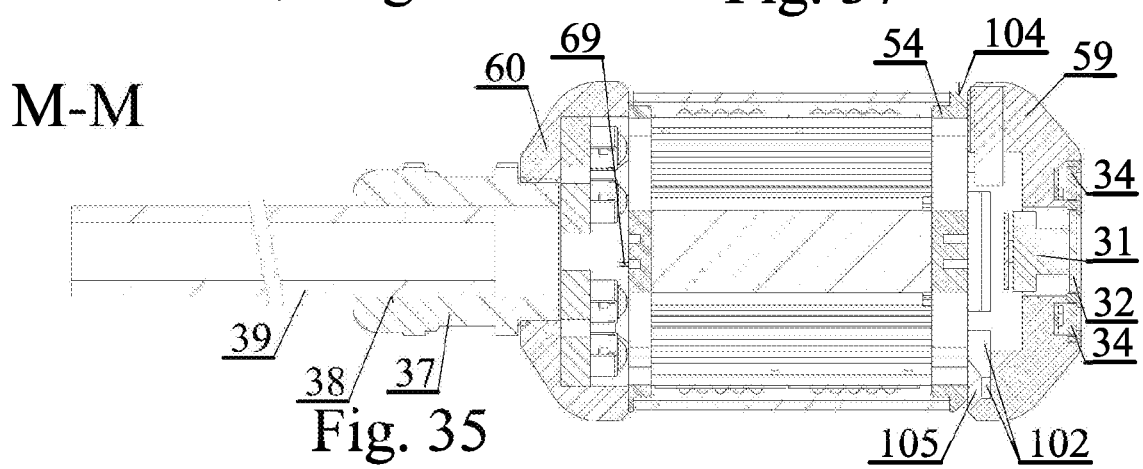
FIG. 35—the same device in axial section along line M-M.
Figure 36:
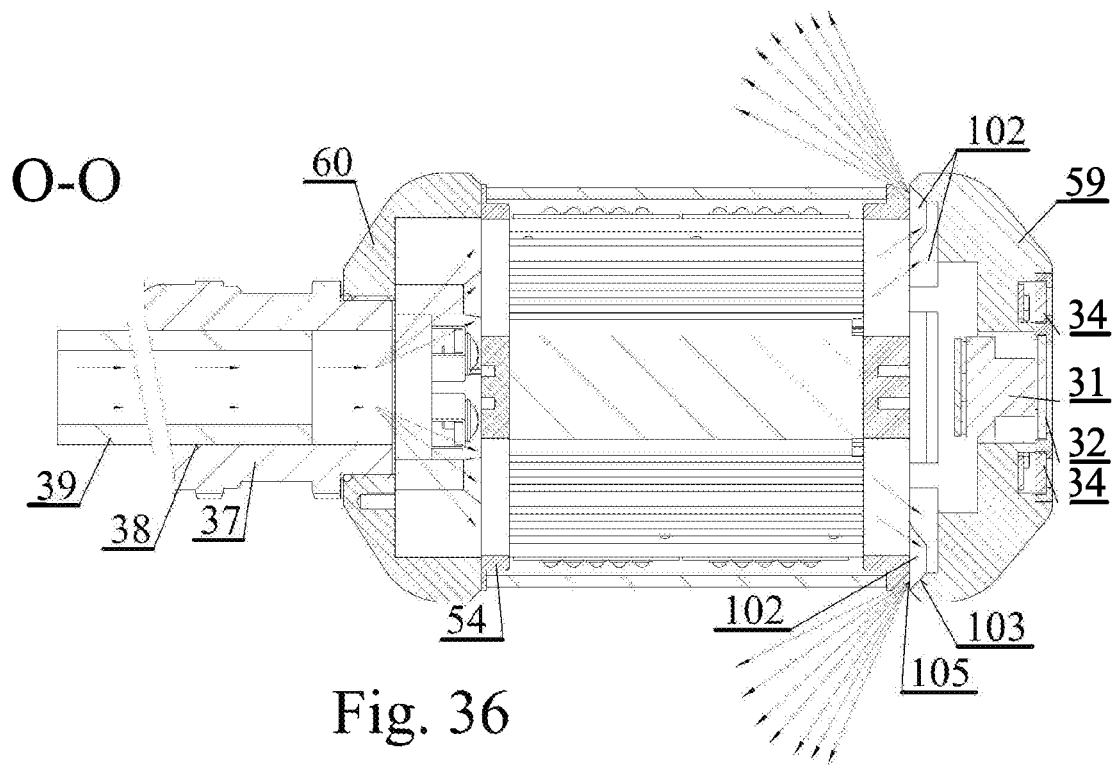
FIG. 36—the same device in axial section along line O-O.

The device for curing pipeline inner resin linings according to the third variant of its embodiment shown in FIGS. 15-17 constitutes a device shown in FIGS. 1-8 or in FIGS. 9-14 but equipped additionally with two vehicle assemblies 71 and 72. Each of the comprises three arms 73 with identical lengths, whereas arms of the vehicle assembly 71 are attached detachably to the profiled front cover 22, and arms of the vehicle assembly 72 are attached detachably to the rear cover 23 of the device, whereas the arm are evenly distributed (every 120°) on circumferences of the covers, and their ends are equipped with two revolving wheels 74 each situated on a circumference adapted to the inner diameter of the cured sleeve-shaped resin lining.

The device for curing pipeline inner resin linings shown in FIGS. 18-23 constitutes a set of two devices composed of the above-described device 75 according to the first variant of its embodiment shown in FIGS. 1-8 and of the second device 76 with structure similar to this of the device 75 except for the front cover 22 which in this case lacks the assembly comprising the cover 30 with the monitoring camera 31 places in it, the camera-shielding glass plate 32, and camera illumination LEDs 34; the two devices connected with each other by means of hose 39 supplying cooling compressed air whereas each of the two devices 75 and 76 may be equipped with above-described vehicle assemblies 71 and 72 each (not shown in figures).

The device for curing pipeline inner resin linings according to the fourth variant of its embodiment shown in FIGS. 24-27 has also a monolithic metal body 77 in the form of a cylinder outer surface of which is also provided with twelve flat facets 79 distributed symmetrically on circumference of its circle 78 with radius R2, constituting chords of the circle, two which, by means of screws 80, attached are identical strip-shaped plastic plates 81 and 81' arranged in two rows along said facets with twelve plates in each row, in which installed are LEDs 6 emitting electromagnetic radiation with wavelength 500 nm, said LEDs being situated next to each other in six rows, five LEDs in each row, whereas between each two neighbouring chords-flat facets 79 and along the body there are grooves 82 oriented along the horizontal axis 83 of the body with height equalling about ⅔ of the length of radius R2 of the circle, forming thus twelve FIG. 84 profiles of which, in the side view (or in cross section), have the shape close to an isosceles trapezium two longer inner sides of which are provided on their surfaces with obliquely oriented grooves 85 with their bottoms 86 diminishing towards the axis 83 forming thus a Christmas-tree-shaped profile, where the grooves are separated from each other by ribs 87 functioning, together with the grooves, as radiators 88, whereas all the grooves 82, in their lower portions, are terminated with longitudinal circular grooves 89, analogous to these shown in FIG. 7 and denoted with number 14. Further, to both flat front surfaces 90 of the body 77, there are round plate-shaped brackets 17 and 17' fixed by means of bolts (not shown in the figures), identical to those depicted in FIG. 8 showing the first variant of embodiment of the device, to which, by means of bolts 91, attached is a profiled front cover 22 and a profiled rear cover 23, whereas the outer diameter of the body 77 is about two times as large as outer diameters of any of the covers. Also in this variant of the device, alike in the first variant of its embodiment, the front cover 22 is equipped with identical monitoring camera 30 with a front glass plate 32 and LEDs 34 illuminating the camera, and the rear cover 23 is equipped with a sleeve-shaped stuffing box 37 with hose 39 connected to it and supplying compressed air from outside via trapezoidal holes 24 in bracket 17' to radiators 88 cooling LEDs 6 and 34. Moreover, this variant of the device is equipped also in vehicle assemblies 71 and 72 as those shown in FIGS. 15-17, and its body 77 is also equipped with the device temperature sensor 92.

Further, the device for curing pipeline inner resin linings according to the fifth variant of its embodiment shown in FIGS. 28-33 has a monolithic metal body 1 the same as this of the first variant of its embodiment described above and shown in FIGS. 1-8, equipped with LEDs 6, with the two face elements joined by means of bolts 16 with brackets 17 and 17' and with the sleeve-shaped glass LED protecting shield 20, and bracket 17 is joined by means of bolts 21 with the front cover 22 equipped with casing 30 for the monitoring camera 31 shielded with a glass plate 32, LEDs 34 illuminating the field of vision of the camera, and outlet holes 35 for air cooling the LEDs. Moreover, the fifth variant of the device differs from the first of its variants in that its rear cover 23 is replaced with rear lid 93 having a front sleeve-shaped portion 94, joined by means of a thread 95 with the rear bracket 17', said portion being terminated with a portion in the form of truncated cone 96 provided with profiled axial bore 97 with a stuffing box 98 mounted in it. Surface of conical portion 96 of the lid is provided with inlet holes 99 for air setting in rotational motion the blades 100 of fan 101 mounted inside the sleeve-shaped portion 94 of the lid 93 and cooling LEDs 6 and 34 of the device via trapezium-shaped holes 24 in the bracket 17 and radiators 13.

Possible further alterations to and modifications of the above-described several variants of the device can be obvious for a person skilled in the related art making such further modifications which however will be included within the scope of patent claims protecting the invention.

The device according to the invention in its e.g. first variant of embodiment shown in FIGS. 1-8 and FIGS. 15-17, is placed, depending on current needs, as a single device, inside the front end of the lining sleeve containing a resin cured by means of electromagnetic radiation, placed earlier in the renovated pipeline, and then, compressed air is supplied from outside into the device via its sleeve-shaped stuffing box 37 and electric leads 40 and 41 are connected to the electric power grid starting thus emission of electromagnetic radiation onto resin lining by LEDs 6 and switching on the LEDs 34 illuminating the camera 31, whereas by means of a dragging rope (not shown in figures) with one end hooked to an element of the front cover 22 and with the second end wound onto any known windlass means, the device is dragged by means of any known method along the pipeline. As a result of pressure generated by the compressed air in the course of moving the device along the pipeline, the resin lining is being pressed against the inner surface of the pipeline, and the influence of electromagnetic radiation with definite properly selected wavelengths from the range 300-500 nm generated by LEDs 6 and with properly selected power results in proper curing of resin of the pipeline along the whole of its length.

Another, sixth variant of the device for curing pipeline inner resin linings shown in FIGS. 34-37 has a design similar to this of the device described above as the first and the second variants of its embodiment shown in FIGS. 1-8 and FIGS. 9-14, with the difference between the variants of the device consisting only in that in this sixth variant of the embodiment, the front cover 22 or 59 of the body 1 or 44 has no outlet holes 35 for air cooling LEDs 6 installed on outer surface of the body. Instead of the holes, the circumference of upper inner surface of the front cover 22 or 59 is provided with profiled recesses 102 with circumferential facet 103, and the upper edge of bracket 17 or 54 connected with the cover is provided with circumferential facet 104 situated in parallel to and opposite the facet 103, forming thus an obliquely oriented outlet nozzle 105 for compressed air which, after cooling LEDs 6 and still under pressure, is directed onto the cured pipe illuminated by the LEDs.

LEGEND

1—metal body
2—body circle circumference
3—flat facets-chords of the body
R, R1, R2—circle radius
4—screws
5, 5'—plastic plates
6—light-emitting diodes (LEDs)
7—slit-shaped grooves
8—body radius axis
9—radiator figures-profiles
10—rounded grooves
11—groove bottoms
12—radiator ribs
13—radiators
14—circular grooves
15—flat face surfaces of the body
16—bolts
17, 17'—brackets
18—recesses in brackets
19—glass shield packer
20—sleeve-shaped shield
21—bolts
22—front cover of the device
23—rear cover of the device
24—profiled holes in brackets
25, 25'—shorter sides of trapezium holes
26—annular portion of brackets
27—four holes in brackets
28—two holes in brackets
29 single hole in brackets
30—camera glass shield
31—monitoring camera
32—camera glass plate
33—bean-shaped holes
34—camera lighting LEDs
35—front cover air outlet holes
36—rear cover threaded hole
37—sleeve-shaped stuffing box
38—stuffing box axial bore
39—compressed air discharge hose
40, 41—LEDs supplying electric leads
42—device temperature sensor
43—lining sleeve temperature sensor
44—cylindrical body of the second variant of the device
45—T-shaped figures of radiators
46—slit-shaped recesses
47—rectangular offsets
48—upper element of T-shaped profile
49—longer element of T-shaped profile
50—semi-circular groves
51—radiators of the second variant of the device
52—flat surfaces of the body
53—bolts
54, 54'—brackets
55—annular recesses
56—shield packer
57—sleeve-shaped shield
58—bolts
59—front cover of the device
60—rear cover of the device
61—profiled holes
62—rib-shaped elements of brackets
63—holes in brackets
64—core portion of brackets
65—holes
66—groove
67—hole
68—lining sleeve temperature sensor
69—device temperature sensor
70—measuring converter
71, 72—vehicle assemblies
73—vehicle assembly arms
74—vehicle assembly revolving wheels
75—the first device of the third set variant
76—the second device of the third set variant
77—device body
78—device body circle
79—flat facets-chords of the device
80—screws
81, 81'—LED-carrying plastic plates
82—grooves in the device body
83—horizontal axis of the device
84—trapezoidal FIGS.
85—rounded grooves
86—groove bottoms
87—groove ribs
88—radiators of the body
89—circular grooves
90—flat face surfaces of the body
91—bolts
92—device temperature sensor 93—rear lid
94—sleeve-shaped portion of lid
95—thread joint
96—conical profile of lid
97—axial hole in lid
98—stuffing box
99—air inlet holes in lid
100—fan blades
101—fan
102—profiled recess
103—circumferential facet
104—circumferential facet
105—compressed air outlet nozzle

The invention claimed is:

1. A device for curing pipeline inner resin linings with the use of resin compound cured by electromagnetic radiation, the device comprising:
   a monolithic cylindrical body having a front end, a back end, an outer end, an inner end, a length, a perimeter, an axis, two axially extreme cylindrical ends and an axially middle cylindrical portion, the two extreme cylindrical portions having a diameter larger than a diameter of the middle cylindrical portion, the middle cylindrical portion having a polyhedral shape;
   a front cover secured to the front end of the cylindrical portion;
   a back cover secured to the back end of the cylindrical portion;
   a plurality of flat facets distributed symmetrically through the entire length and the perimeter of the cylindrical portion;
   a plastic plate connected to the plurality of flat facets;
   a plurality of light-emitting diodes (LEDs) located on an outer side of each one of the plurality of flat facets, the LEDs are distributed through a length of each one of the plurality of facets, the LEDs generate radiation to cause curing of said resin compound, said radiation having a wavelength of 200-500 nm, wherein said LEDs are shielded with an element made of transparent glass or quartz glass;
   slit-shaped grooves located between each two adjacent flat facets, each one of the slit-shaped grooves extend radially towards the axis of the cylindrical portion, each one of the slit-shaped grooves terminated with a circular groove near the axis of the cylindrical body;
   wherein the slit-shaped grooves on each one of the flat facets from figure profiles having a shape that decreases in width from the outer end to the axis of the cylindrical portion, each one of the figure profiles includes oblique grooves, the oblique grooves decrease in size from the outer end to the inner end of each one of the plurality of flat facets, the oblique grooves are separate from each other by a rib;
   wherein the ribs and the oblique grooves carry away the heat generated by the LEDs;
   wherein the cylindrical portion includes a front shield connected to the front cover of the cylindrical body and a back shield connected to the back cover of the cylindrical portion, the front shield element having a hole extending axially straight-through from an inlet side to an outlet side along the axis of the cylindrical portion;
   wherein an inlet of the axial straight-through hole is provided with compressed air for cooling the LEDs and the front shield element is equipped with a fan cooling the LEDs via a radiator, and
   a front bracket and a back bracket are respectively secured to the front end and to the back end of the cylindrical portion;
   wherein the front end of the device is equipped with a LED temperature monitoring sensor, a monitoring camera, a hose for supplying compressed air for cooling the LEDs, electrical leads supplying electrical power to LEDs, temperature sensors, vehicle assemblies, and a hook for a rope dragging the device along the pipeline.

2. The device according to claim 1, wherein the monitoring cameras are shielded with glass plates, and over the glass plates are mounted LEDs for illuminating the cameras, and over the LEDs are located outlet holes (35) for air cooling the LEDs.

3. The device according to claim 1, wherein upper inner ends of each one of the brackets are provided with annular recesses in which a shield for the LEDs is permanently mounted.

4. The device according to claim 1, wherein the back end of the body is detachably connected to a rear lid, the rear lid includes a sleeve-shaped portion having a fan (101) with blades (100).

5. The device according to claim 1, wherein the plastic plates are detachably connected to the flat facets.

6. A device for curing pipeline inner resin linings with the use of resin compound cured by electromagnetic radiation, the device comprising:
   a monolithic cylindrical body having a front end, a back end, an outer end, an inner end, a length, a perimeter, an axis, two axially extreme cylindrical ends and an axially middle cylindrical portion, the two extreme cylindrical portions having a diameter larger than a diameter of the middle cylindrical portion, the middle cylindrical portion having a polyhedral shape;
   a front cover secured to the front end of the cylindrical portion;
   a back cover secured to the back end of the cylindrical portion;
   a plurality of flat facets distributed symmetrically through the entire length and the perimeter of the cylindrical portion;
   a plastic plate connected to the plurality of flat facets;
   a plurality of light-emitting diodes (LEDs) located on an outer side of each one of the plurality of flat facets, the LEDs are distributed through a length of each one of the plurality of facets, the LEDs generate radiation to cause curing of said resin compound, said radiation having a wavelength of 200-500 nm, wherein said LEDs are shielded with an element made of transparent glass or quartz glass;
   slit-shaped grooves located between each two adjacent flat facets, each one of the slit-shaped grooves extend radially towards the axis of the cylindrical portion, each one of the slit-shaped grooves terminated with a circular groove near the axis of the cylindrical body;
   wherein the slit-shaped grooves on each one of the flat facets from figure profiles having a shape that decreases in width from the outer end to the axis of the cylindrical portion, each one of the figure profiles includes oblique grooves, the oblique grooves decrease in size from the outer end to the inner end of each one of the plurality of flat facets, the oblique grooves are separate from each other by a rib;
   wherein the ribs and the oblique grooves carry away the heat generated by the LEDs;

wherein the cylindrical portion includes a front shield connected to the front cover of the cylindrical portion and a back shield connected to the back cover of the body, the front shield element having a hole extending axially straight-through from an inlet side to an outlet side along the axis of the cylindrical portion;

wherein an inlet of the axial straight-through hole is provided with compressed air for cooling the LEDs and the front shield element is equipped with a fan cooling the LEDs via a radiator, and a front bracket and a back bracket are respectively secured to the front end and to the back end of the cylindrical portion;

wherein the front end of the device is equipped with a LED temperature monitoring sensor, a monitoring camera, a hose for supplying compressed air for cooling the LEDs, electrical leads supplying electrical power to LEDs, temperature sensors, vehicle assemblies, and a hook for a rope dragging the device along the pipeline;

wherein the LEDs are connected functionally with each other to activate and deactivate them alternately, depending on the required quantity of electromagnetic radiation to be delivered onto the cured surface.

* * * * *